United States Patent [19]

Yamamoto et al.

[11] Patent Number: 4,639,152

[45] Date of Patent: Jan. 27, 1987

[54] PRINTING APPARATUS WITH A THERMAL PRINT HEAD

[75] Inventors: Takemi Yamamoto; Yasutaka Tomida, both of Nagoya, Japan

[73] Assignee: Brother Kogyo Kabushiki Kaisha, Aichi, Japan

[21] Appl. No.: 681,584

[22] Filed: Dec. 14, 1984

[30] Foreign Application Priority Data

Dec. 20, 1983 [JP] Japan ................................ 58-240612
Dec. 20, 1983 [JP] Japan ................................ 58-240613

[51] Int. Cl.[4] .......................... B41J 3/20; H05B 3/00; G01D 15/10

[52] U.S. Cl. ................................ 400/120; 400/613.3; 279/216; 346/76 PH; 226/45

[58] Field of Search ..................... 400/120, 611, 613.3, 400/618, 636, 641, 635; 219/216; 346/76 PH; 226/45; 38/101

[56] References Cited

U.S. PATENT DOCUMENTS

| | | | |
|---|---|---|---|
| 3,917,048 | 11/1975 | Riley | 400/618 X |
| 3,968,679 | 7/1976 | Ralborsky | 226/45 X |
| 4,140,907 | 2/1979 | Oba . | |
| 4,165,029 | 8/1979 | Mitchell . | |
| 4,173,420 | 11/1979 | Okabe | 400/618 |
| 4,314,757 | 2/1982 | Anderson et al. | 226/45 X |
| 4,322,044 | 3/1982 | Bilek . | |
| 4,434,637 | 3/1984 | Bailey | 226/45 |
| 4,470,055 | 9/1984 | Todoh | 400/120 X |

FOREIGN PATENT DOCUMENTS

| | | | |
|---|---|---|---|
| 134446 | 11/1978 | Japan . | |
| 10474 | 2/1981 | Japan | 400/613.3 |
| 25459 | 3/1981 | Japan | 400/120 |
| 49290 | 5/1981 | Japan . | |
| 32990 | 2/1982 | Japan | 400/120 |
| 144780 | 9/1982 | Japan | 400/618 |
| 7376 | 1/1983 | Japan . | |
| 8669 | 1/1983 | Japan . | |
| 183281 | 10/1983 | Japan . | |
| 1274 | 1/1984 | Japan | 400/120 |
| 76281 | 5/1984 | Japan | 400/120 |

OTHER PUBLICATIONS

IBM Tech. Disc. Bulletin, "Web–Tension Sensing Devices", Buckholz et al., vol. 25, No. 4, Sep. 1982, pp. 2066–2067.

Xerox Disc Jour., "Wrinkle Control Rolls", Wong et al., vol. 8, No. 4, Jul./Aug. 1983, pp. 289–290.

IBM Tech. Disc. Bulletin, "Wrinkle Eliminator for Continuous–Roll Paper Feed", Allan et al., vol. 26, No. 4, Sep. 1983, pp. 1841–1842.

IBM Tech Disc. Bulletin, "Tape Tension Detection", Dang et al., vol. 26, No. 6, Nov. 1983, pp. 2990–2991.

*Primary Examiner*—Edgar S. Burr
*Assistant Examiner*—James R. McDaniel
*Attorney, Agent, or Firm*—Parkhurst & Oliff

[57] ABSTRACT

A printing apparatus for printing on a sheet of paper via a thermal ribbon comprising: a paper feeding device for feeding the sheet of paper; a thermal print head including heat generating elements which are held in pressed contact with the surface of the sheet of paper via the thermal ribbon, the heat generating elements being selectively energized to apply heat to an ink layer of the thermal ribbon to fuse the ink for adherence of the fused ink to the surface of the paper; a detecting device for sensing the smoothness of the surface of the sheet of paper fed by the paper feeding device; a print-quality improving device for improving the quality of printing on the sheet of paper; and a control device for activating the print-quality improving device while the sensed smoothness is lower than a preset lower limit, the control device deactivating the print-quality improving device while the sensed smoothness is not lower than the preset lower limit.

10 Claims, 17 Drawing Figures

PRINTING APPARATUS WITH A THERMAL PRINT HEAD

BACKGROUND OF THE INVENTION

The present invention relates to a thermal printing apparatus for printing on a sheet of paper via a thermal ribbon having a thermally transferable ink layer, which has a thermal print head including heat generating elements which are held in pressed contact with the surface of the sheet of paper via the thermal ribbon and which are selectively energized to apply heat to the ink layer of the thermal ribbon to fuse the ink for adherence of the fused ink to the surface of the paper to print characters, symbols, graphical representations, etc.

In a commonly known thermally printing apparatus constructed as shown in FIG. 17, a printing operation is achieved by pressing a thermal print head 108, via a thermal ribbon 112, against a relatively uneven surface of a sheet of paper 114 set on a platen 113. When heat is generated by heat generating elements 108*a* at a front end portion of the thermal print head 108, an ink 112*b* on the thermal ribbon 112 is fused and adheres to the surface of the paper 114. After the thermal ribbon 112 is pulled via a separating roller 116 and separated from the paper 114, layers of the ink are transferred to the paper 114, as indicated at a, b, c, d and e in FIG. 17. In such a thermal printer, the use of a sheet of paper having an unsmooth or uneven printing surface will lead to application of a thin ink as seen at b or partial application of the ink as shown at c due to the roughness or uneveness of the surface, resulting in reduced printing density, unevenly or partially printed characters and figures, and other defects. Consequently, the print quality on the paper 114 will be reduced as a whole.

SUMMARY OF THE INVENTION

Accordingly, it is an object of the present invention to provide a printing apparatus having a thermal print head, which is capable of performing a high-quality printing on an unsmooth or uneven surface of a sheet of paper.

It is another object of the invention to provide a thermal printing apparatus wherein a special device is activated for improving print quality when a sheet of paper having an unsmooth printing surface is supplied, but held in the non-operated condition when a sheet of paper having a smooth printing surface is supplied.

It is still another object of the invention to provide such a thermal printer which improves the smoothness of a sheet of paper prior to a printing on the paper having an unsmooth printing surface.

It is a further object of the invention to provide a thermal printer which improves print quality by heating a sheet of paper after a printing operation on the paper with a low level of surface smoothness.

According to the present invention, there is provided a printing apparatus for printing on a sheet of paper via a thermal ribbon having a thermally transferable ink layer. The printing apparatus comprises a paper feeding device for feeding the sheet of paper, and a thermal print head including heat generating elements which are held in pressed contact with the surface of the sheet of paper via the thermal ribbon. The heat generating elements are selectively energized to apply heat to the ink layer of the thermal ribbon to fuse the ink for adherence of the fused ink to the surface of the paper. The printing apparatus further comprises a detecting device for sensing the smoothness of the surface of the sheet of paper fed by the paper feeding device, and a print-quality improving device for improving the quality of printing on the sheet of paper. The detecting device and the print-quality improving device are connected to a control device which activates the print-quality improving device while the smoothness sensed by the detecting device is lower than a preset lower limit, and which deactivates the print-quality improving device while the sensed smoothness is not lower than the present lower limit.

In the thermally printing apparatus constructed as described above according to the invention, when a sheet of paper having a low level of smoothness is supplied, the supply of such paper is sensed by the detecting device and the control device activates the print-quality improving device so that superior print quality is also achieved on such paper with a low smoothness. Moreover, when a sheet of paper with a high grade of smoothness is supplied, the control device does not activate the print-quality improving device to eliminate a print-quality improving process, thereby saving useless energy and also saving a coating agent in the case where such an agent is used.

According to one embodiment of the invention, the print-quality improving device is disposed upstream of the thermal print head in the direction of feed of the sheet of paper by the paper feeding device.

In one advantageous form of the above embodiment of the invention, the print-quality improving device comprises a smoothness improving device for improving the smoothness of the surface of the paper. In this instance, the smoothness improving device may comprise a pressing device for applying a pinching pressure to opposite surfaces of the sheet of paper.

Alternatively, the smoothness improving device may comprise a humidifying device for humidifying the sheet of paper, and a pressing device for applying a pinching pressure to opposite surfaces of the humidified sheet of paper. In this arrangement of the printing apparatus, the smoothness improving device may further comprise a heating device for applying heat to the humidified sheet of paper.

Further, the smoothness improving device may comprise a coating device for coating the sheet of paper with a coating agent for improving the smoothness of its surface.

According to an alternative embodiment of the invention, the print-quality improving device is disposed downstream of the thermal print head in the direction of feed of the sheet of paper by the paper feeding device.

In one advantageous form of the above embodiment of the invention, the print-quality improving device comprises a heating device for heating the ink adhering to the surface of the printed sheet of paper.

In the above case, the heating device may comprise a pair of rollers at least one of which incorporates a heating element, and the pair of rollers are rotatable in rolling contact with the opposite surfaces of the printed sheet of paper bearing the ink.

BRIEF DESCRIPTION OF THE DRAWINGS

The above and other objects, features and advantages of the present invention will become more apparent from reading the following description of the preferred embodiment taken in connection with the accompanying drawings in which.

DETAILED DESCRIPTION OF THE PREFERRED EMBODIMENTS

Referring now to the accompanying drawings, the invention will be more fully described in its preferred embodiments. It is to be understood, however, that the invention is not confined to the precise disclosure and that changes and modifications may be made herein which do not affect the spirit of the invention nor exceed the scope thereof as expressed in the appended claims.

Figure 1:
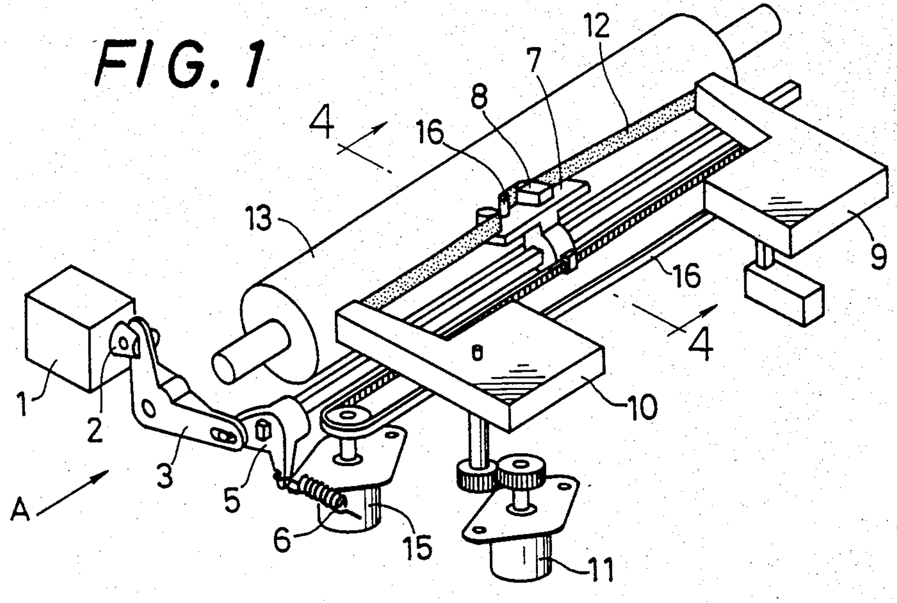
FIG. 1 is a perspective view of one embodiment of a printing apparatus of the invention, showing its mechanism.
Figure 2:
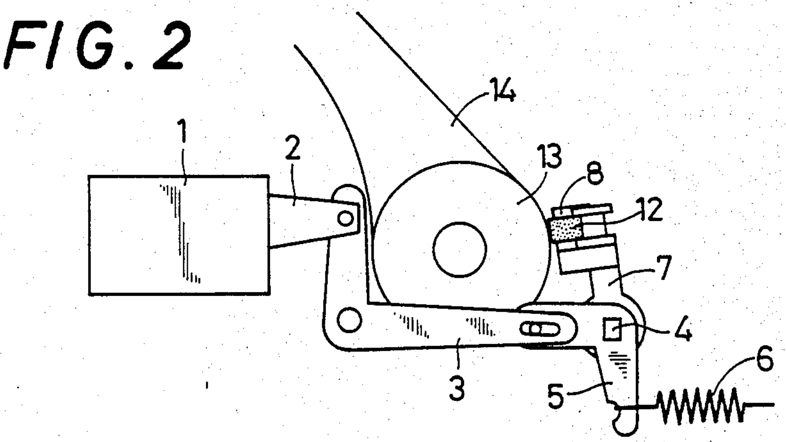
FIG. 2 is an enlarged view taken in the direction of arrow A, showing a thermal print head while it is held in contact with a platen.
Figure 3:
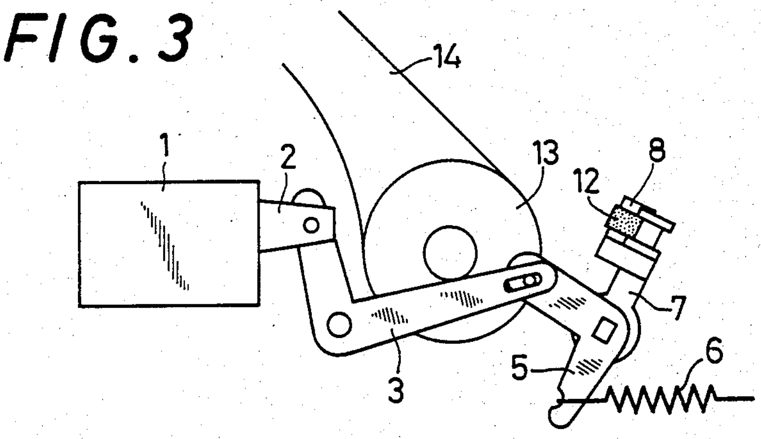
FIG. 3 is a view corresponding to FIG. 2 showing the thermal print head while it is located away from the platen.

There is shown in FIGS. 1-3 a printing apparatus in one preferred form of the invention, which comprises a solenoid 1 having a plunger 2 which is operatively connected to a guide bar 4 through a first and a second pivotable lever 3, 5. One arm of the first lever 3 is connected to the external end of the plunger 2, and the other arm of the first lever 3 engages one arm of the second lever 5. This second lever 5 is fixed to the guide bar 4 such that the pivotal movement of the second lever 5 about the axis of the guide bar 4 will cause the guide bar 4 to be rotated. The second lever 5 is biased by a spring 6 in a counterclockwise direction as viewed in FIG. 2. The guide bar 4 extends through a carriage 7 so that the carriage 7 is supported slidably on the guide bar 4. The carriage 7 carries a thermal print head 8. While the solenoid is off (i.e., while the plunger 2 is at its extended position), the print head 8 is held under action of the spring 6 in pressed contact, via a thermal ribbon 12, with a sheet of paper 14 placed on a platen 13 extending along the guide bar 4, as illustrated in FIG. 2. This thermal ribbon 12 which has a thermally transferable ink layer (as indicated at 12*b* in FIG. 6), is fed at appropriate timings from a removable feed cassette 9 toward a removable take-up cassette 10 through rotation of a ribbon drive motor 11 operatively connected to the take-up cassette 10. The carriage 7 is driven by a carriage drive motor 15 via a timing belt 16.

Figure 4:
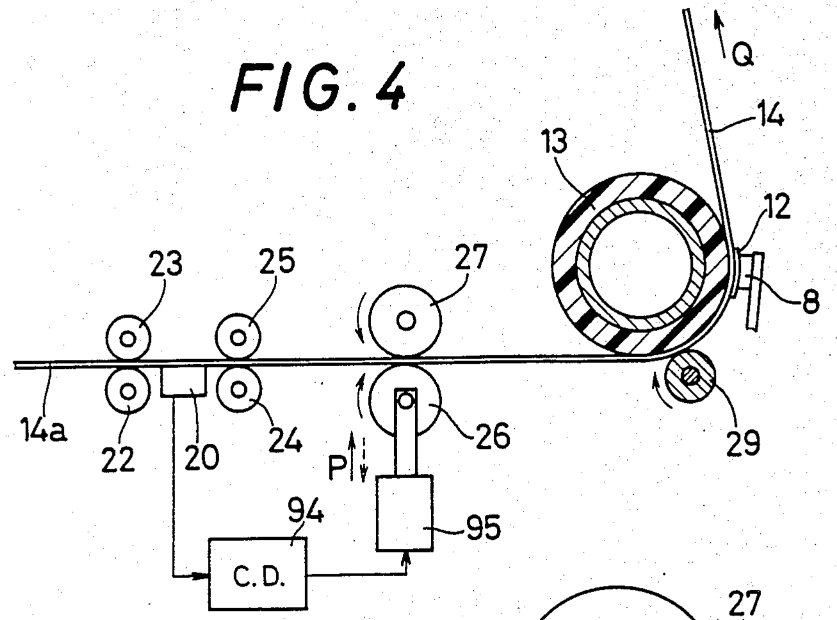
FIG. 4 is a cross sectional view of the apparatus taken generally along the line 4—4 of FIG. 1.

In the thermal printing apparatus constructed as described above, when a sheet of paper having an unsmooth printing surface is supplied, the paper is fed through a clearance between the platen 13 and the thermal print head 8 after its smoothness is improved. Such a smoothness improving device is shown in FIG. 4. A detecting device in the form of a reflection-type sensor 20 for measuring the smoothness of a printing surface 14*a* of a sheet of paper 14, and is disposed between a pair of front rollers 22, 23 and a pair of rear rollers 24, 25. The front rollers 22, 23 for applying backward tensions to the paper 14 provide appropriate tensions to a portion of the paper 14 located between the front rollers 22, 23 and the rear rollers 24, 25, thereby improving the accuracy of smoothness measurement.

Pressing rollers 26, 27 smooth the paper 14 by applying a pinching pressure to opposite surfaces of the paper, and constitute a smoothness improving device for the paper 14. While the smoothness of the paper 14 detected by the reflection-type sensor 20 is lower than a preset lower limit (for example, 50 sec. in Bekk smoothness), a control device or controller 94 sends a signal to an actuator 95 to move the pressing roller 26 toward the pressing roller 27 so that the pressing roller 26 applies a pinching pressure P to the paper 14 in cooperation with the pressing roller 27. When the detected smoothness is not lower than the present lower limit, the controller 94 commands the pressing roller 26 to move downwardly so as not to apply the pinching pressure to the paper 14. In this case, the value of smoothness (above-mentioned preset value) which determines whether to move the pressing roller 26 or not can be changed as desired.

The platen 13 holds the paper 14 in cooperation with a paper retaining roller 29, feeds the paper 14 through a clearance between the platen 14 and the thermal print head 8 in a direction indicated by arrow Q.

Figure 5:
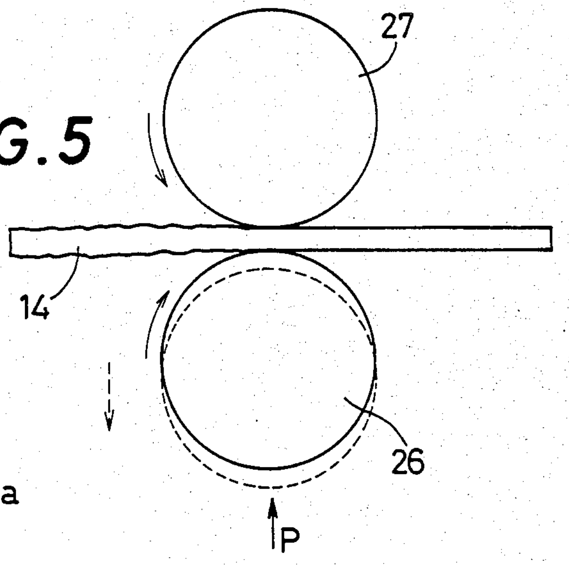
FIG. 5 is an enlarged cross sectional view of the pressing rollers of FIG. 4, showing a smoothing operation of a sheet of paper.
Figure 6:
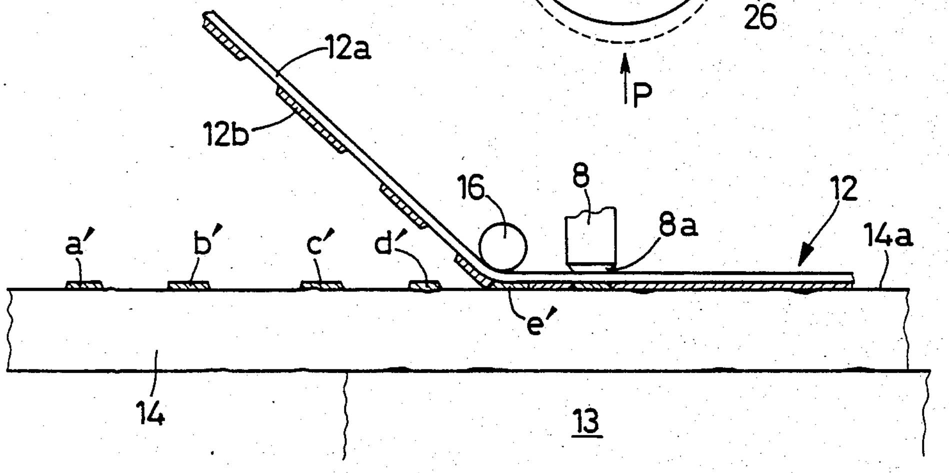
FIG. 6 is a fragmentary, cross sectional view of the printing apparatus of FIGS. 1-5, showing the printing condition.

In the thermal printing apparatus constructed as described above, a printing process proceeds as explained below. The paper 14 is first supplied, and the smoothness of its printing surface 14*a* is measured by the sensor 20 located between the front rollers 22, 23 and the rear rollers 24, 25. While the smoothness is lower than 50 sec., the paper 14 is smoothed by the pinching pressure P of the pressing rollers 26, 27 as shown by solid line of FIG. 5. When the smoothness of the printing surface 14*a* is not lower than 50 sec., the pressing roller 26 moves to a position indicated by broken line of FIG. 5 so as not to apply the pinching pressure P to the paper 14. The paper 14 is then fed through a clearance between the platen 13 and the thermal ribbon 12, as shown in FIG. 6, by the platen 13 and paper retaining roller 29. When a printing operation is performed, the thermal ribbon 12 is pressed between the paper 14 and heat generating elements 8*a* of the thermal print head 8 and heat is generated by the heat generating elements 8*a*. The heat is transmitted to an ink 12*b* (ink layer) via a film 12*a* of the thermal ribbon 12, whereby the ink 12*b* is fused and adheres to the paper 14. After the thermal ribbon 12 is pulled via the separating roller 16 and separated from the paper 14, characters as indicated at a', b', c', d' and e', having predetermined widths and thicknesses of the ink, are transferred to the smoothed printing surface 14*a* of the paper 14.

Figure 7:
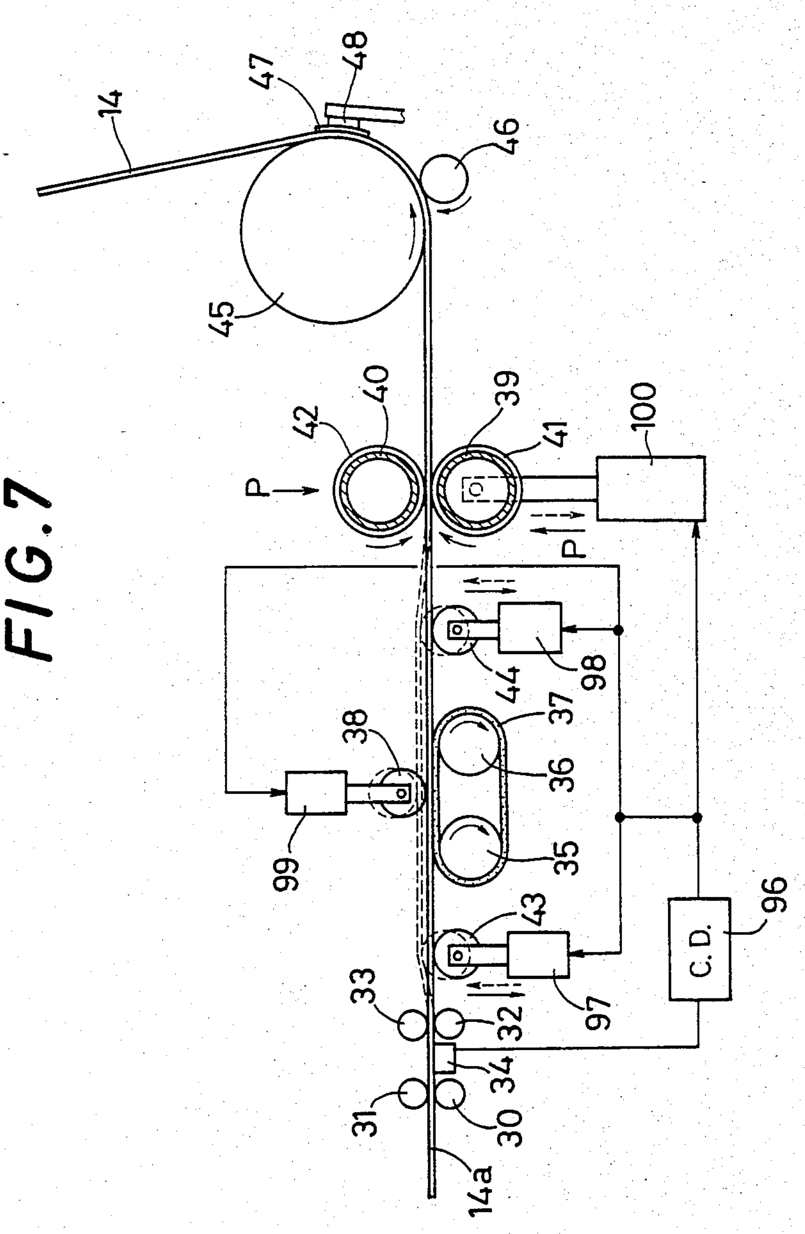
FIG. 7 is a cross sectional view of another embodiment of the invention, corresponding to FIG. 4.

When it is desired to further improve the smoothness, a device shown in FIG. 7 can be applied. Namely, the smoothness of the printing surface 14*a* of paper 14 is detected by a reflection-type sensor 34 located between front rollers 30, 31 and rear rollers 32, 33. While the smoothness is lower than 60 sec., for example, a controller 96 sends a signal to actuators 97, 98 and 99 so that the first, second and third pinching rollers 38, 43 and 44 are placed in the portions indicated by solid lines in FIG. 7. In this condition, the paper 14 is humidified by a humidifying felt belt 37 rotated by belt rollers 35, 36 while the paper 14 is pressed by the first pinching roller 38 and the felt belt 37. The paper 14 is then smoothed by a pinching pressure P of a pair of heating rollers 41, 42 which incorporate heat generators 39, 40, respectively. When the smoothness is not lower than 60 sec., the controller 96 causes the actuators 97, 98 and 99 to move the second and third pinching rollers 43 and 44, and the first pinching roller 38, in the directions indicated by broken line arrows, respectively, whereby the paper 14 is moved to a position indicated by broken line and is not humidified. Further, a actuator 100 is operated to move the heating roller 41 in the direction indicated by broken line arrow, and heat is not generated by the heat generators 39, 40.

The paper 14 is then fed through a clearance between a platen 45 and a thermal ribbon 47 by the platen 45 and a paper retaining roller 46. When a printing operation is effected, the thermal ribbon 47 is pressed between the paper 14 and the thermal print head 48, and an ink of the thermal ribbon 47 is transferred to the paper 14 by the thermal print head 48.

Figure 8:
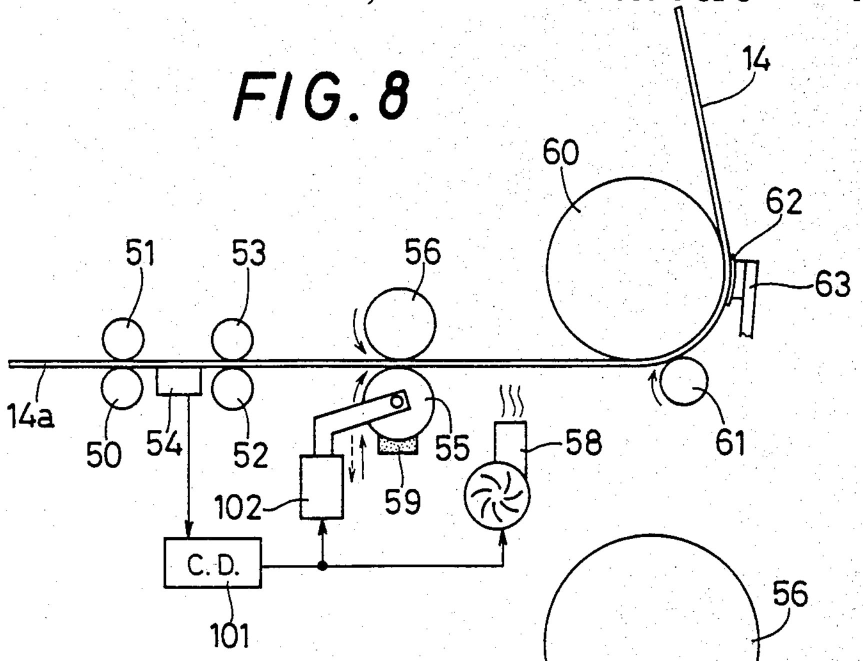
FIGS. 8-10 are cross sectional views of still another embodiment of the invention, corresponding to FIGS. 4-6, respectively.
Figure 9:
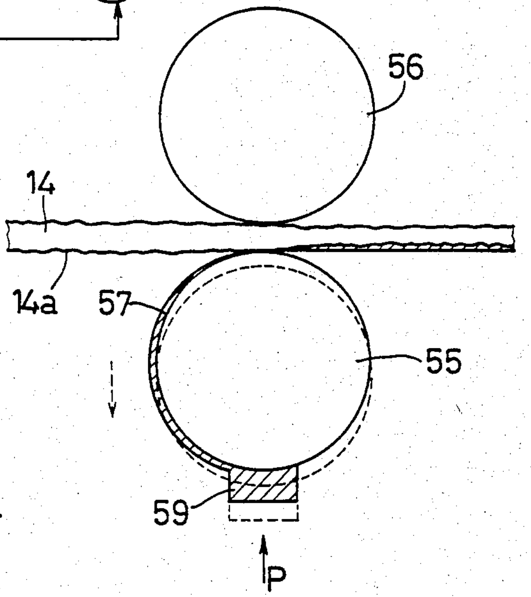
Figure 10:
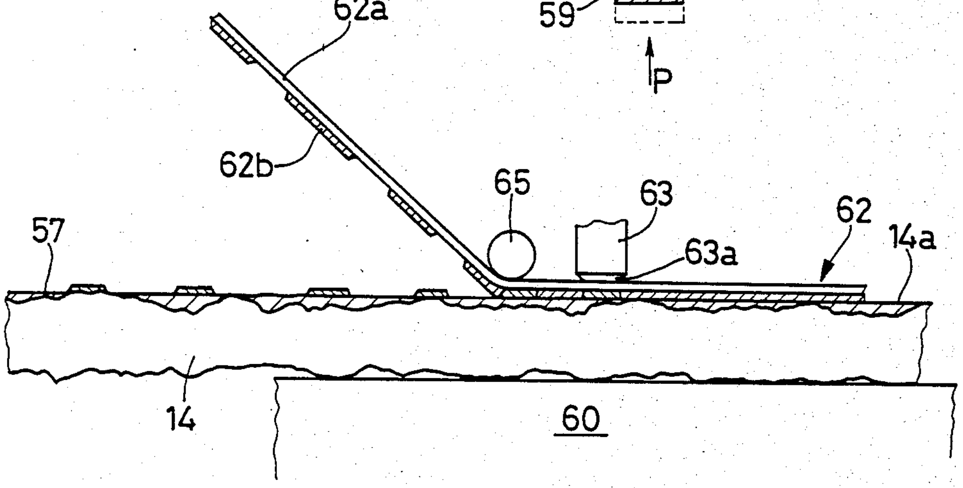

FIGS. 8–10 show another embodiment of the printing apparatus which allows the smoothing of only the printing surface 14*a* of the paper 14.

In this embodiment, the smoothness of the printing surface 14*a* of paper 14 is detected by a reflection-type sensor 54 located between front rollers 50, 51 and rear rollers 52, 53. While the smoothness is lower than 70 sec., for example, a controller 101 sends a signal to an actuator 102 to move a coating roller 56 so that a coating agent 57 is applied to the printing surface 14*a* of the paper 14 by the coating roller 55, while the paper 14 is pinched by the roller 56 and a roller 56, as shown in FIG. 9. Further, a signal is applied to a heat blower 58 so that the coating agent 57 is dried by the heat blower 58. The coating roller 55 is in contact with a coating agent supplier 59 which accommodates the coating agent 57. As the coating agent 57, it is recommended to use filler or loading material, such as calcium carbonate and titanium oxide, resin, or wax. When the smoothness is not lower than 70 sec., the coating roller 55 moves in a broken line arrow direction so that the coating agent 57 is not applied to the paper 14, and also the heat blower 58 is turned off.

The paper 14 is then fed through a clearance between a platen 60 and a thermal ribbon 62 by the platen 60 and a paper retaining roller 61. When a printing is executed, the thermal ribbon 62 is pressed between the paper 14 and heat generating elements 63*a* at a front end portion of a thermal print head 63, and heat is generated by the heat generating elements 63*a*. The heat is transmitted to an ink 62*b* through a film 62*a* of the thermal ribbon 62, whereby the ink 62*b* is fused and adheres to the paper 14. After the thermal ribbon 62 is pulled via a separating roller 65 and separated from the paper 14, the ink 62*b* is transferred to the paper 14.

Figure 11:
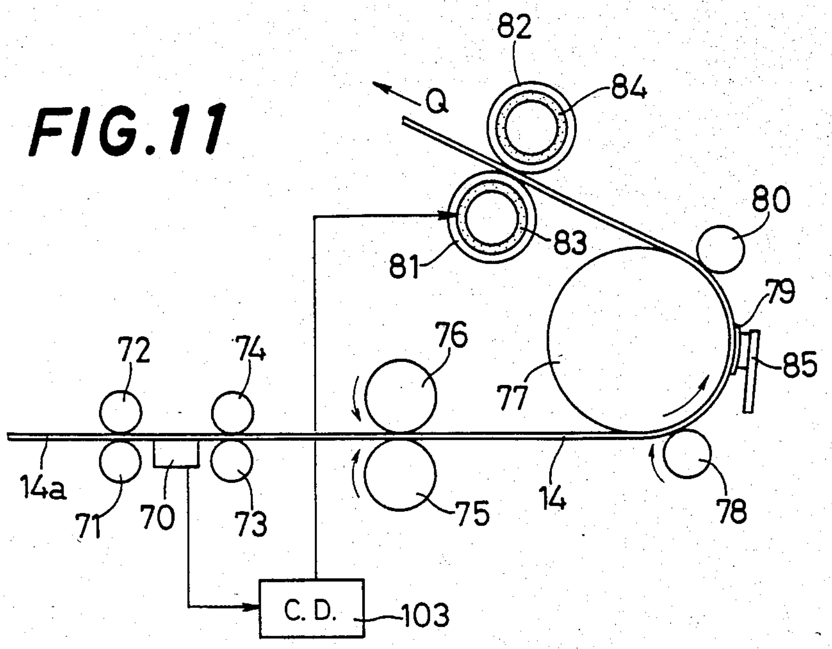
FIG. 11 is a fragmentary, cross sectional view of a further embodiment of the invention, corresponding to FIG. 4.

In a further embodiment of the printing apparatus as shown in FIG. 11, means for heating the paper 14 after a printing operation may be disposed downstream of the thermal print head in the direction of feed of the sheet of paper 14.

A reflection-type sensor 70 for measuring the smoothness of the printing surface 14*a* of paper 14 is disposed between a pair of front rollers 71, 72 and a pair of rear rollers 73, 74.

Paper feed rollers 75, 76 feed the paper 14 to a platen 77. The platen 77 and a first pinching roller 78 cooperate to retain the paper 14 therebetween, and feed the paper 14 through a clearance between the platen 77 and a thermal ribbon 79. The thermal ribbon 79 is disposed such that its ink 79*b* contacts the paper 14.

The printed paper 14 is then fed through a clearance between a pair of heating rollers 81 and 82 by the platen 77 and a second pinching roller 80. The heating rollers 81, 82 incorporate heat generators 83, 84, respectively, which are controlled by the above described sensor 70.

Figure 12:
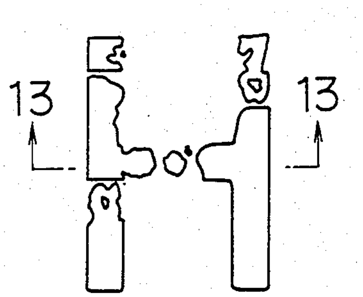
FIG. 12 is an enlarged plan view of a character printed by the apparatus of FIG. 11, showing the condition passing between heating rollers.
Figure 14:
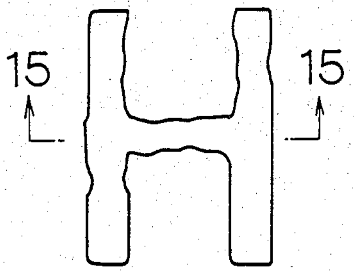
FIG. 14 is an enlarged plan view of the printed character after passing between the heating rollers.
Figure 13:
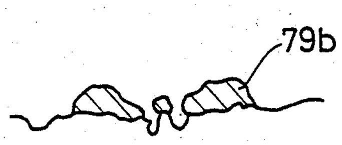
FIG. 13 is a cross sectional view of the character of FIG. 12 taken along line 13—13.
Figure 15:
FIG. 15 is a cross sectional view of the character of FIG. 14 taken along line 15—15.

In the thermal printer constructed as described above, a printing process proceeds as explained hereafter. The paper 14 is first supplied, and the smoothness of the printing surface 14*a* is measured by the reflection-type sensor 70 between the front rollers 71, 72 and the rear rollers 73, 74. The paper 14 is then fed through a clearance between the platen 77 and the thermal ribbon 79 by the paper feed rollers 75, 76, the platen 77 and the first pinching roller 78. When the thermal ribbon 79 is pressed by the thermal print head 85, a printing operation is achieved, and the printed paper 14 is then fed through a clearance between the heating rollers 81 and 82 by the platen 77 and the second pinching roller 80. While the smoothness of the printing surface 14*a* of paper 14 is lower than 90 sec., an ink 79*b* may be transferred to the printing surface 14*a* in a partially printed or discontinuous state as shown in FIGS. 12 and 13. Therefore, a controller 103 sends a signal to the heat generators 83, 84 to reheat the ink 79*b* transferred to the paper 14 so that the ink 79*b* is uniformed in width and thickness as shown in FIGS. 14 and 15, whereby print quality is improved. When the smoothness is not lower than 90 sec., the ink 79*b* of the thermal ribbon 79 is positively transferred to the paper 14 with a predetermined width and thickness. Accordingly, the heat generators 83, 84 do not generate heat, and the heating rollers 81, 82 feed the paper 14 in the direction indicated by arrow Q. The paper 14 with a high level of smoothness is not heated because the finely transferred pattern of the ink 79b may be expanded or displaced sidewise by the heat, causing discontinuity, deformation, or battering of the pattern of character.

Consequently, only a sheet of paper with low print quality (low smoothness) is reheated, with the sensor 70 selectively activating the heat generators 83, 84 of the heating rollers 81, 82. It is also noted that the temperature of the heat generators 83, 84 is controlled depending on the level of smoothness of paper 14, i.e., temperature of the heat generators 83, 84 is increased for a sheet of paper with low smoothness or reduced for a sheet of paper with high smoothness, whereby the print quality is improved.

Figure 16:
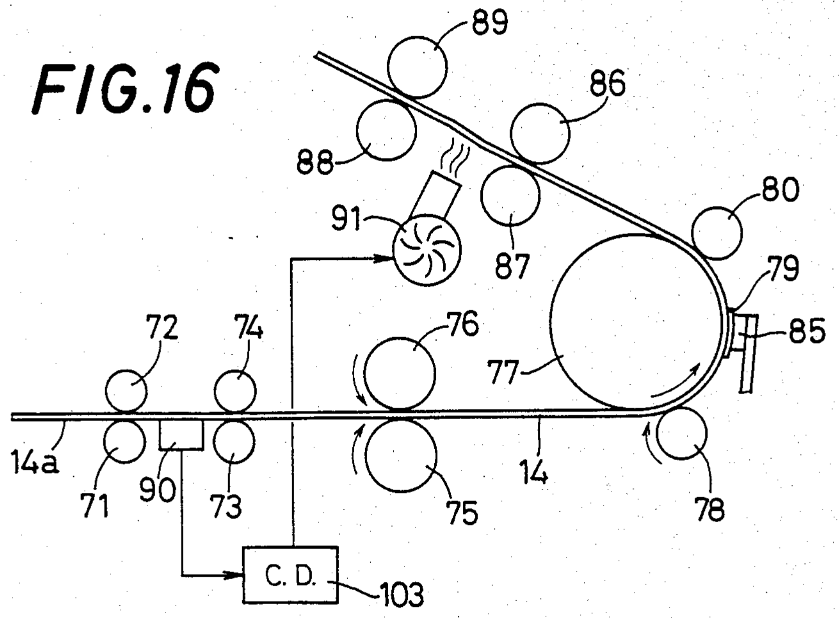
FIG. 16 is a fragmentary, cross sectional view of a still further embodiment of the invention, corresponding to FIG. 4.
Figure 17:
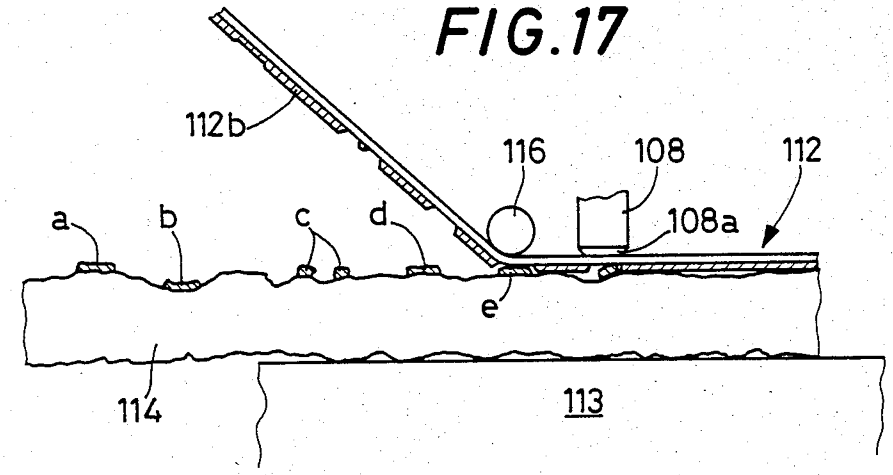
FIG. 17 is a fragmentary, cross sectional view of an example of a conventional thermal printing apparatus, showing its printing condition.

Means for heating the paper 14 after a printing operation may be constructed as shown in FIG. 16, wherein the components which correspond to those of FIG. 11 are provided with the same reference numerals as used in FIG. 11, and these components are not explained hereafter.

First rollers 86, 87 and second rollers 88, 89 may be provided downstream of the thermal print head 85, and also a heat blower 91 controlled by a sensor 90 may be disposed at a position opposite to the printing surface 14*a* of the paper 14 and between the first rollers 86, 87 and the second rollers 88, 89. By blowing hot air from the side opposite to the printing surface 14*a* of the paper 14, a transferred ink is not fused and expanded more than required, whereby the pattern of characters is not deformed. Further, the hot air permits the ink to infiltrate into the interior of the paper 14, and increases the adhesion to the paper 14.

It will be appreciated that another type of sensor may be utilized instead of the reflection-type sensor which is used as a detecting device for detecting the smoothness of the paper in each of the above described embodiments.

What is claimed is:

1. A printing apparatus for printing on a sheet of paper via a thermal ribbon having a thermally transferable ink layer, comprising:

a paper feeding device for feeding the sheet of paper;

a thermal print head including heat generating elements which are held in pressed contact with the surface of said sheet of paper via said thermal ribbon, said heat generating elements being selectively energized to apply heat to said ink layer of the thermal ribbon to fuse the ink for adherence of the fused ink to the surface of the paper;

a first pair of rollers disposed on opposite sides of a path along which said sheet of paper is fed toward said thermal print head, and a second pair of rollers disposed on opposite sides of said path, said first and second pairs of rollers applying a tension to a portion of said sheet of paper between the first and second pairs of rollers;

a detecting device disposed between said first and second pairs of rollers in the direction of feed of said sheet of paper for sensing the surface smoothness of said sheet of paper fed by said paper feeding device;

a print-quality improving device for improving the quality of printing on said sheet of paper, said print-quality improving device being disposed downstream of said detecting device in said direction of feed of said sheet of paper; and a control device connected to said detecting and print-quality improving devices and activating said print-quality improving device while said surface smoothness sensed by said detecting device is lower than a preset lower limit, said control device deactivating said print-quality improving device while the sensed surface smoothness is not lower than said preset lower limit.

2. The printing apparatus of claim 1, wherein said print-quality improving device is disposed upstream of said thermal print head in the direction of feed of the sheet of paper by said paper feeding device.

3. The printing apparatus of claim 2, wherein said print-quality improving device comprises a smoothness improving device for improving the smoothness of the surface of the paper.

4. The printing apparatus of claim 3, wherein said smoothness improving device comprises a pressing device for applying a pinching pressure to opposite surfaces of said sheet of paper.

5. The printing apparatus of claim 3, wherein said smoothness improving device comprises a humidifying device for humidifying said sheet of paper, and a pressing device for applying a pinching pressure to opposite surfaces of the humidified sheet of paper.

6. The printing appratus of claim 5, wherein said smoothness improving device further comprises a heating device for applying heat to the humidified sheet of paper.

7. The printing apparatus of claim 3, wherein said smoothness improving device comprises a coating device for coating said sheet of paper with a coating agent for improving the smoothness of its surface.

8. The printing apparatus of claim 1, wherein said print-quality improving device is disposed downstream of said thermal print head in the direction of feed of the sheet of paper by said paper feeding device.

9. The printing apparatus of claim 8, wherein said print-quality improving device comprises a heating device for heating the ink adhering to the surface of the printed sheet of paper.

10. The printing apparatus of claim 9, wherein said heating device comprises a pair of rollers at least one of which incorporates a heating element, said pair of rollers being rotatable in rolling contact with the opposite surfaces of the printed sheet of paper bearing the ink.

* * * * *